R. L. BOYD.
FRONT END CONSTRUCTION FOR VEHICLES.
APPLICATION FILED MAY 14, 1914.
1,158,168.
Patented Oct. 26, 1915.
4 SHEETS—SHEET 1.
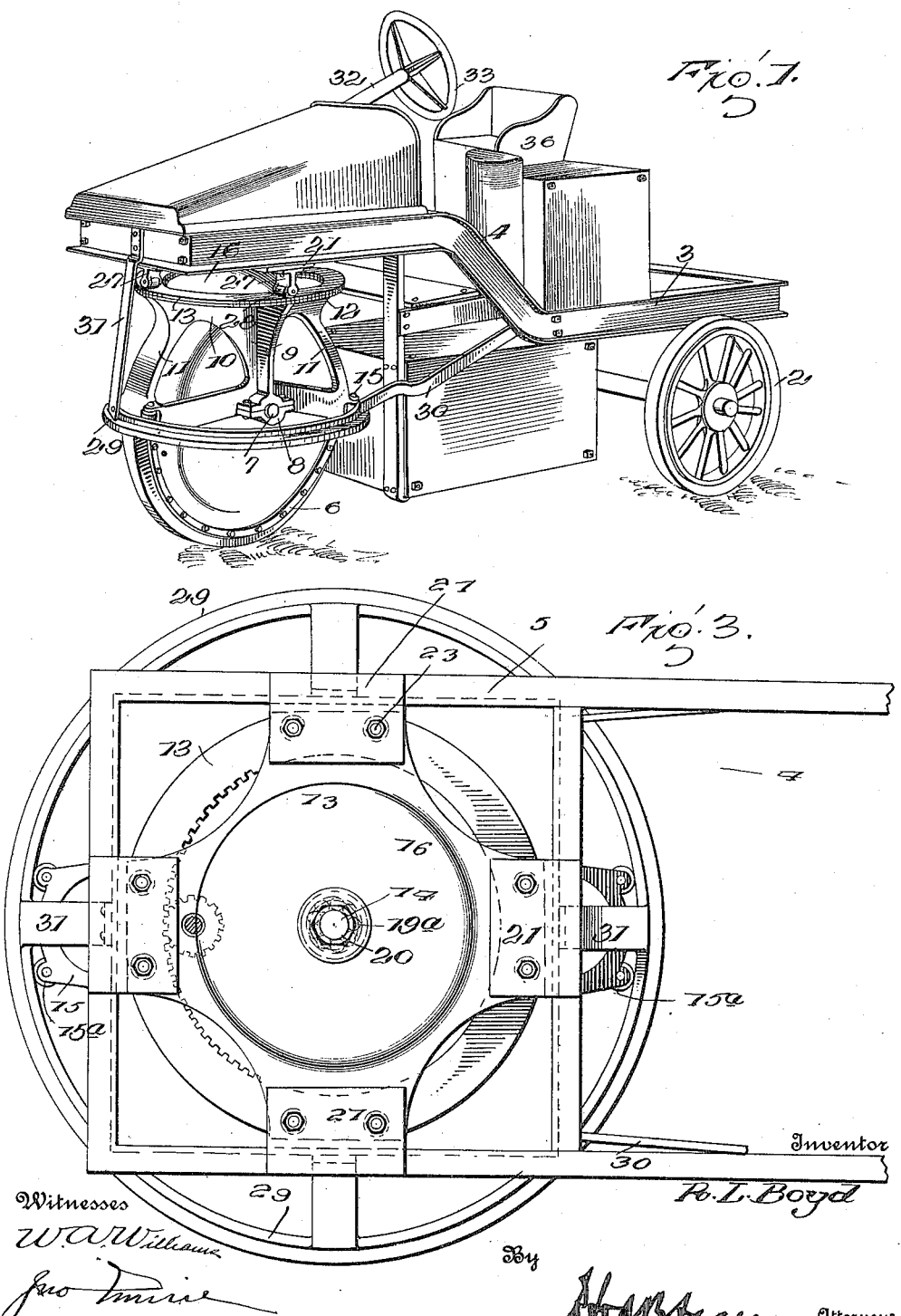

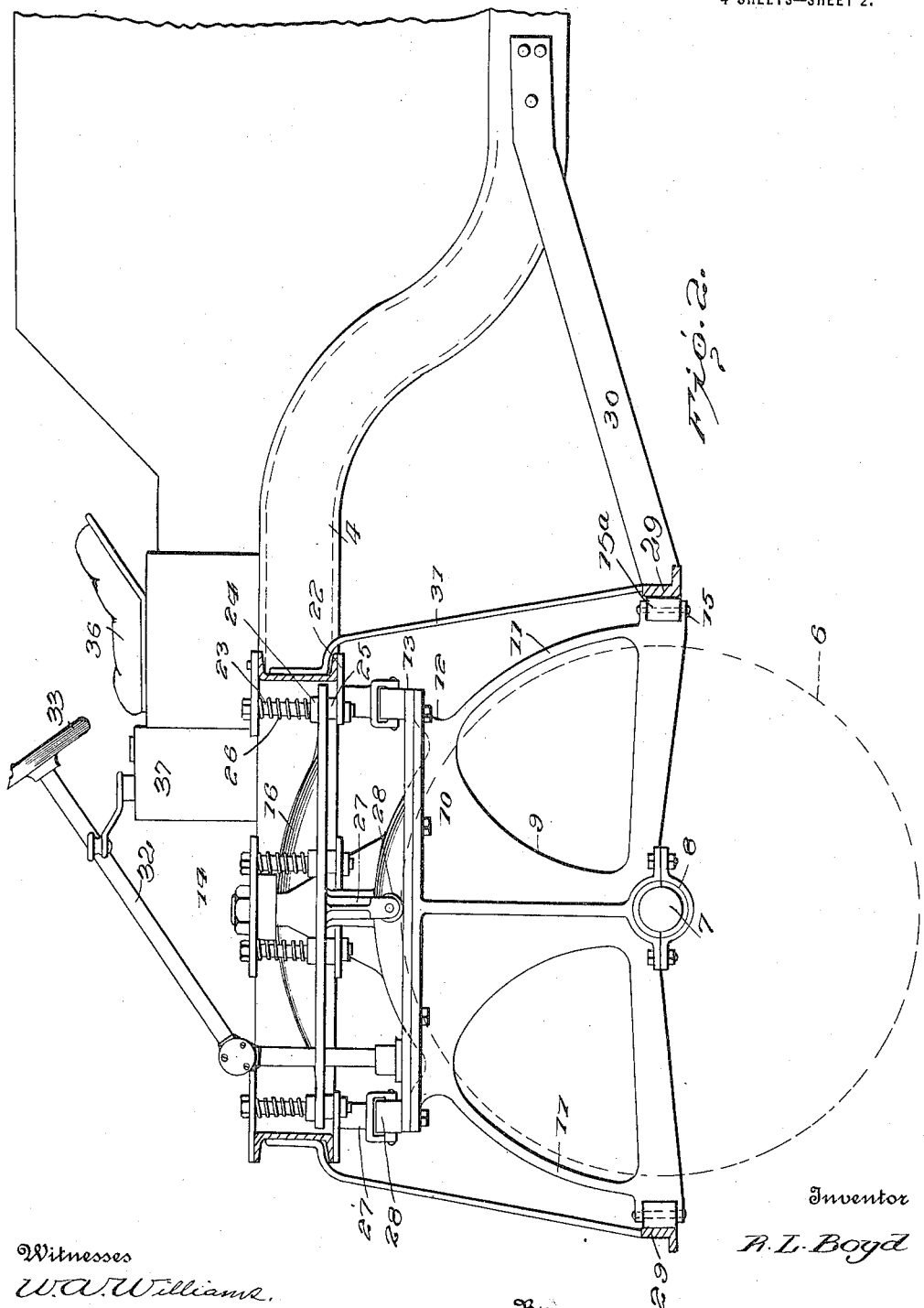

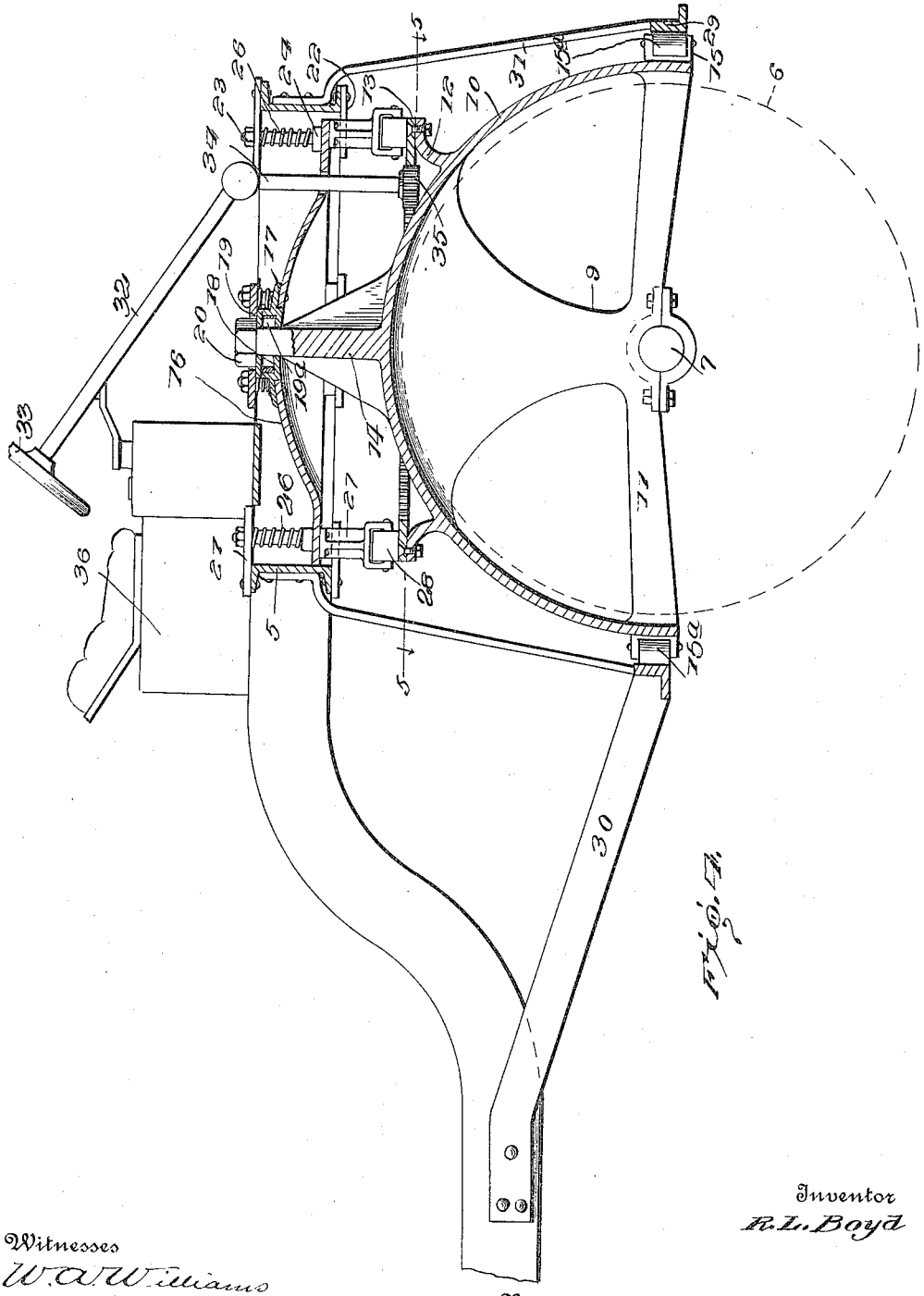

R. L. BOYD.
FRONT END CONSTRUCTION FOR VEHICLES.
APPLICATION FILED MAY 14, 1914.
1,158,168.
Patented Oct. 26, 1915.
4 SHEETS—SHEET 4.
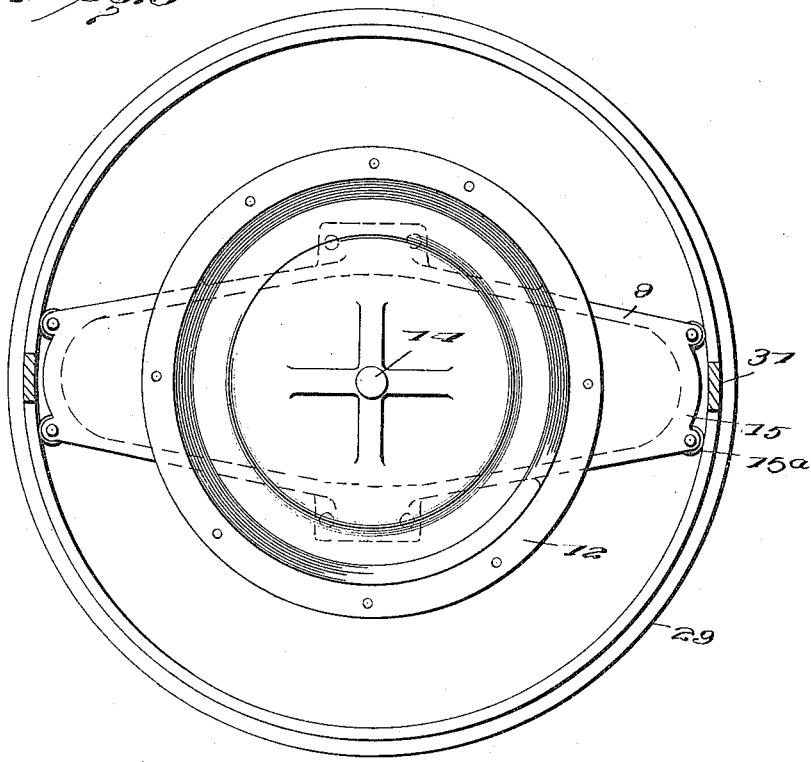
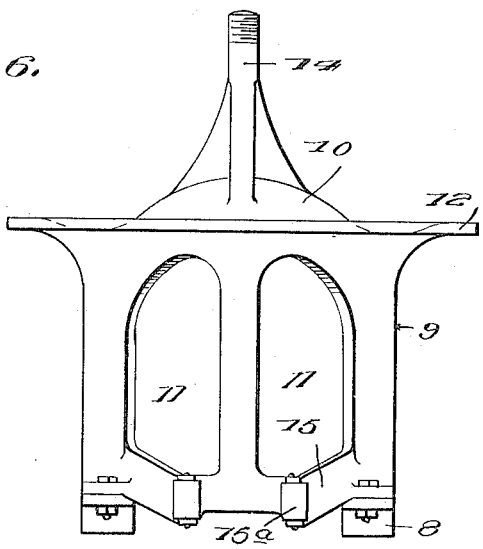

UNITED STATES PATENT OFFICE.

ROBERT L. BOYD, OF MERIDIAN, LOUISIANA.

FRONT-END CONSTRUCTION FOR VEHICLES.

1,158,168.　　　　Specification of Letters Patent.　　Patented Oct. 26, 1915.

Application filed May 14, 1914. Serial No. 838,534.

*To all whom it may concern:*

Be it known that I, ROBERT L. BOYD, citizen of the United States, residing at Meridian, in the parish of Evangeline and State of Louisiana, have invented certain new and useful Improvements in Front-End Construction for Vehicles, of which the following is a specification.

My invention relates to vehicles, and particularly to that type of vehicle in which a front steering wheel is used, said wheel being the power or traction wheel.

The primary object of my invention is the provision of a novel front end construction for traction vehicles whereby the front steering wheel and tractor may be properly supported.

A further object of my invention is the provision of means for supporting the steering traction wheel for free steering movement in a horizontal plane and at the same time cushioning the wheel against shocks and jars.

Still another object of the invention is the provision of means for cushioning the frame structure of the vehicle against shocks and jars communicated to the wheel.

Other objects will appear in the course of the following description.

My invention is illustrated in the accompanying drawings wherein:

Figure 1 is a perspective view of an industrial vehicle constructed in accordance with my invention. Fig. 2 is a side elevation of the front end of the vehicle shown in Fig. 1, the channel beams being shown in section. Fig. 3 is a top plan view of the construction illustrated in Fig. 2. Fig. 4 is a vertical central longitudinal section of the front end of the vehicle as seen from the reverse side. Fig. 5 is a section on the line 5—5 of Fig. 4. Fig. 6 is a front elevation of the wheel supporting frame, the wheel, however, not being illustrated.

Corresponding and like parts are referred to in the following description and indicated in all the views of the accompanying drawings by the same reference characters.

My invention is applicable to vehicles of many different forms wherein a front steering and traction wheel is used, and my invention is therefore not limited to the particular type of vehicle illustrated in Fig. 1. In the form of vehicle illustrated in Fig. 1, however, 2 designates the rear wheels of the vehicle and 3 a channel iron frame whose body portion is approximately rectangular. The beams 3 at their forward ends are inclined upward and forward as at 4 and are then attached to a rectangular frame of channel iron.

The wheel 6 may be of any suitable construction and is driven by means of a motor such as an electric motor supported within the wheel itself. The wheel, of course, is formed with the laterally projecting axle 7. This axle is supported in suitable bearings 8 carried by a wheel supporting frame desnated generally 9, the front elevation of which is shown in Fig. 6. This frame 9 comprises a domical web 10 conforming in curvature to the curvature of the wheel and within which the upper half of the wheel is housed. The sides of this domical housing are cut away as at 11 so as to lighten the construction of this part. The upper face of this domical housing is formed with the upwardly and outwardly curved annular flange 12 upon which is bolted the annular rack 13. At the apex of the domical wheel housing there is provided the upwardly extending, centrally disposed axial stud or post 14 which is screw threaded at its upper end, this post being braced by webs arranged in cruciform relation as illustrated clearly in Figs. 4 and 5. At the lower edge of the housing 10 there are provided the radially projecting brackets 15 in which are supported the antifriction rollers $15^a$.

Mounted upon the upper end of the post 14 is a slightly domical plate 16 cruciform in plan as illustrated in Fig. 3. The central portion of this plate is cut away as at 17 and riveted or otherwise attached to the inner margin of the plate 16 and fitting within the opening 17 is an annular plate 18 through which the standard or post 14 passes. A roller carrying cap 19 has a downwardly extending annular flange which fits within the upwardly extending annular flange of the plate 18 and a nut 20 engaging the screw threaded upper end of the standard 14 bears upon this cap. Disposed within the cap 19 are antifriction rollers $19^a$ which bear against and antifrictionally support the upper end of the post 14. The post 14 has, of course, free rotation within the central opening of the plate 18.

Riveted or otherwise attached to the rectangular channel iron 5 are the inwardly projecting plates 21. There are four of these plates located above the arms of the cruciform plate 16. Disposed below the plates 21 and riveted to the under flanges of the channel iron 5 are the plates 22 which are the same in number as the plates 21 and disposed immediately beneath these plates. Bolts 23 pass through these plates 21 and 22 as illustrated most clearly in Fig. 2, there being a pair of these bolts 23 for each pair of plates 21 and 22. These bolts 23 pass loosely through the arms of the plate 16 and washers 24 and 25 surround these bolts and are disposed respectively on top of and below the plate 16. Coil springs 26 surround these bolts, each spring bearing upon a corresponding washer 24 and bearing against the under face of one of the plates 21. These springs yieldingly resist any upward movement of the plate 16. Depending from the plate 16 are a plurality of downwardly extending brackets 27, preferably four in number, which are bifurcated at their lower ends, each of these brackets carrying an antifriction roller 28 which bears upon the upper face of the annulus 13. It will thus be seen that the wheel supporting frame 9 has free movement of rotation relative to the plate 16, that it is held in normal horizontal position by means of the rollers 28 and that the wheel and wheel frame are free to move upward against the force of the springs 26.

For the purpose of laterally bracing the wheel but permitting it to have free rotary movement, I provide the annular track 29 which is preferably made of angle iron, this track being circular in form and concentric to the vertical axis of the wheel 6, that is, concentric to the post 14 and engaged by the roller 16 as illustrated clearly in Fig. 3. This circular track 29 is supported from the main frame of the machine by means of the rearwardly extending braces 30 and by means of the downwardly extending hangers 31 which at their upper ends are attached to the channel iron annular member 5 as shown clearly in Fig. 4.

For the purpose of rotating the wheel 6 in a horizontal plane, I provide the steering shaft 32, the upper end of which is provided with the steering wheel 33, the lower end of which is connected by a universal joint with a shaft 34 whose lower extremity carries a toothed gear wheel 35 engaging with the toothed inner face of the annulus 13. it will, of course, be understood that the teeth of the annulus may extend only a relatively short distance as, for instance, through a half of a circle. The steering wheel is, of course, disposed in convenient relation to a seat 36 and a controller 37.

It will be noted that the power wheel is mounted centrally in the front end of the vehicle, power being communicated to the wheel through the motor inclosed therein, the energy for driving the wheel being supplied from any suitable source of power as for instance storage batteries. This power wheel is supported at its axis by the forked frame member or housing 9 and the load being communicated to the frame member or housing through the medium of the roller bearings 28.

It will be seen that the central post or standard of the forked frame member or housing 9 is supported in a suitable bearing at its upper terminus, this housing and the wheel inclosed thereby being still further supported and held in proper position under load by the encircling track 29, this track member being supported in a fixed position by its attachment to the body of the vehicle and the friction due to resistance being eliminated by the rolling contact of the rollers 15$^a$ with said track. It will also be noted that the track extends entirely around and forms a complete circle providing a support for the rollers 15$^a$ at all points. It is further to be noted that the plate 16 is supported by the rollers 28, which rollers in turn bear upon a circular track 13 carried upon the forked frame member or housing 10, this track extending around and forming a complete circle providing a support for the rollers at all points. This plate 16 is further provided with suitable means for securely attaching the plate 16 by means of the bolts and springs to the frame or body parts of the vehicle, said bolts and springs providing for a vertical movement of the plate 16 and of the wheel frame or housing when actuated by a load on the frame or body parts or by the spring action.

While I have illustrated helical springs as surrounding the bolts 23, these bolts providing secure anchorage of the plates 16 to the forward end of the vehicle body, I wish it understood that leaf or half elliptical springs are equally adapted to be disposed between the plates 21 and the plates 16. It is further to be understood that while I have illustrated the power wheel as forming part of the truck, this power wheel might constitute a tractor, the load being carried upon the rear portion of the vehicle. While I have illustrated what I believe to be the best and most effective form of my invention and the most effective detail construction, I wish it understood that changes in the arrangement of parts and details of construction might be made without departing from the spirit of the invention.

It will be noted that the side members of beams 4 are extended forward forming three sides of a square opening and with an intermediate beam disposed between the side members, thus closing the fourth side of the opening, the plate 16 being disposed between these four sides. The object of this construction is to provide great rigidity to the wheel when drawing heavy loads. Further it provides protection for the wheel and relieves the plate 16, the stem 14, the plates 21 and 22 and the spring 26 from the strain incident to the tractive effort of the wheel. The wheel being held thus rigidly in alinement with the anti-friction cap 19 allows free movement of the spring 26 under load and relieves the stem 14 of all bending movement.

The wheel frame 9 and the steering shaft being rigidly attached to and moving with the plate 16, provides for a perfect engagement of the pinion 35 with the inner face of the annulus 13 and by this means eliminates all sliding engagement between the steering elements. Again, as the load is carried on springs 26 interposed between the plates 21 and the wheel 9, the load is evenly distributed. The wheel frame 9 being supported at its periphery by the ring 29, the stem 14 is relieved from all bending strain.

What I claim is:

1. In a vehicle, the combination of a body frame, a wheel frame mounted to turn about a vertical axis and to move vertically, a circular track having rigid connection with the wheel frame, a plurality of anti-friction devices carried by the body frame and disposed about the vertical axis of the wheel frame and engaging the circular track and yieldable vertically, an annular track rigidly connected with the body frame, and anti-friction devices carried by the wheel frame and movable both circularly and vertically on the said annular track.

2. In a front end construction for vehicles, a body frame, a wheel, a wheel frame including an annulus disposed in a horizontal plane, a member disposed above the wheel frame and approximately parallel thereto, anti-friction rollers carried by said member and bearing against said annulus, and springs operatively mounted upon the body frame and bearing against said member to urge it downward, the wheel frame having a vertical axial member extending up through the center of said first named member and rotatable with relation thereto.

3. In a front end construction for vehicles, a body frame, a wheel, a wheel frame supporting the wheel and including a central, vertical, axial post and a concentric annulus horizontally disposed, a plate supported above and in spaced relation to the wheel frame and through which said central post passes, brackets depending from the plate, antifriction rollers mounted upon said brackets and bearing against said annulus, and springs operatively supported upon the body frame and bearing down against said plate.

4. In a front end construction for vehicles, a body frame, a wheel, a wheel frame, said wheel frame having an axial, vertically extending post and a concentric annulus, a plate disposed above the wheel frame and in spaced relation thereto and through which said post passes, brackets extending downward from the plate at spaced intervals, antifriction members carried by the lower ends of said brackets and bearing against the annulus, springs operatively supported between the body frame and said plate and disposed at spaced intervals, a circular track, and coacting antifriction rollers, one carried upon the body frame on a plane with the horizontal axis of the wheel and the other carried upon said wheel frame.

5. In a front end construction for vehicles, a body frame, a wheel, a wheel frame including a wheel housing, the upper portion of said housing carrying an annulus and a centrally disposed axial vertically extending post, a plate disposed above the upper end of the wheel frame and through which said post passes, brackets depending from the plate, antifriction rollers carried by the brackets and engaging said annulus, projecting members mounted upon the body frame, pins carried by said projecting members and passing loosely through said plate, and springs supported between said members and the plate and urging the plate downward.

6. In a front end construction for vehicles, a body frame, a wheel, a wheel frame including a wheel housing, the upper portion of said housing carrying an annulus and a centrally disposed axial vertically extending post, a plate disposed above the upper end of the wheel frame and through which said post passes, brackets depending from the plate, antifriction rollers carried by the brackets and engaging said annulus, projecting members mounted upon the body frame, pins carried by said projecting members and passing loosely through said plate, springs supported between said members and the plate and urging the plate downward, a circular track operatively supported from the body frame and disposed concentric to the vertical axis of the wheel frame and disposed in a horizontal plane approximately intersecting the horizontal axis of the wheel, and antifriction rollers carried upon said wheel frame and bearing against the inner face of the track.

7. In a front end construction of the character described, a body frame, a wheel, a wheel supporting frame and housing extending down on each side of the wheel and having a domical upper portion and an axial vertically extending post, an annulus carried by the frame disposed in a horizontal plane and concentric to the post, a concavo-convex plate disposed above the upper end of the frame, said plate being bowed upwardly, the said post passing centrally through the plate, members depending from the plate and carrying antifriction rollers bearing against the annulus, and springs mounted upon the body frame and urging said plate downward.

8. In a front end construction for vehicles, a body frame, a wheel, a wheel frame forming a housing and inclosing the upper end of the wheel, the upper portion of the wheel frame being domical in form and having a central, vertically disposed post and a concentric flange, an annulus bolted to said flange, an upwardly bowed plate disposed above the upper end of the wheel frame and through which said post passes, antifriction bearings between the post and the central portion of said plate, brackets depending at intervals from the margin of the plate, antifriction rollers carried by said brackets and bearing against the annulus, projecting members attached to the body frame and projecting over the margin of the plate, guide pins depending from said projecting members and passing loosely through the margin of the plate, springs disposed around said guide members and each bearing at one end against one of the projecting members and at its other end bearing against said plate, a circular track disposed on a level with the axis of the wheel and concentric to the vertical axis thereof, and antifriction rollers carried by said wheel frame and bearing against said track.

9. In a front end construction for vehicles, a body frame, a wheel, a wheel frame forming a housing for the wheel, said wheel frame having rotation in a horizontal plane around a vertical axis, an annulus carried by the wheel frame and concentric to its vertical axis, an upwardly domed plate disposed above the upper end of the wheel frame, antifriction bearings carried by said plate and bearing against the annulus, and resilient means carried by the body frame and exerting pressure downward upon said plate.

10. In a front end construction for vehicles, a body frame, a wheel and a wheel frame comprising a housing extending circumferentially over the wheel and having sides extending downward across the sides of the wheel, wheel bearings carried upon the lower edges of said sides, a central vertical post extending upward from the upper end of the housing and formed with cruciform webs, and means for exerting downward pressure upon said housing.

In testimony whereof I affix my signature in presence of two witnesses.

ROBERT L. BOYD. [L. S.]

Witnesses:
W. P. HUDSON,
B. M. HUDSON.

Copies of this patent may be obtained for five cents each, by addressing the "Commissioner of Patents, Washington, D. C."